(12) United States Patent
Sinai et al.

(10) Patent No.: US 11,461,757 B2
(45) Date of Patent: Oct. 4, 2022

(54) METHOD AND SYSTEM FOR FARE COLLECTION AND VALIDATION ON A TRANSPORTATION NETWORK

(71) Applicant: Adom Intelligent Transport LTD., Tel Aviv (IL)

(72) Inventors: Ofer Sinai, Petach Tikva (IL); David Mezuman, Raanana (IL)

(73) Assignee: Adom Intelligent Transport Ltd., Tel Aviv (IL)

( * ) Notice: Subject to any disclaimer, the term of this patent is extended or adjusted under 35 U.S.C. 154(b) by 0 days.

(21) Appl. No.: 15/328,271

(22) PCT Filed: Dec. 9, 2014

(86) PCT No.: PCT/IL2014/051074
§ 371 (c)(1),
(2) Date: Jan. 23, 2017

(87) PCT Pub. No.: WO2016/012994
PCT Pub. Date: Jan. 28, 2016

(65) Prior Publication Data
US 2017/0213205 A1    Jul. 27, 2017

(30) Foreign Application Priority Data
Jul. 23, 2014 (WO) .................. PCT/IL2014/050671

(51) Int. Cl.
*G06Q 20/26* (2012.01)
*G07B 15/02* (2011.01)
(Continued)

(52) U.S. Cl.
CPC ............. *G06Q 20/26* (2013.01); *G06Q 10/02* (2013.01); *G06Q 20/3276* (2013.01); *G07B 15/02* (2013.01); *G06Q 2240/00* (2013.01)

(58) Field of Classification Search
CPC .... G06Q 20/26; G06Q 10/02; G06Q 20/3276; G06Q 2240/00; G07B 15/02
See application file for complete search history.

(56) References Cited

U.S. PATENT DOCUMENTS

2008/0195428 A1* 8/2008 O'Sullivan .... G06Q 10/063112
705/6
2011/0006922 A1* 1/2011 Tsuboi .................. G08G 1/123
725/75
(Continued)

FOREIGN PATENT DOCUMENTS

WO    WO 2013/164579    11/2013

OTHER PUBLICATIONS

M. Hofmann and M. O'Mahony, "Transfer journey identification and analyses from electronic fare collection data," Proceedings. 2005 IEEE Intelligent Transportation Systems, 2005., 2005, pp. 34-39, doi: 10.1109/ITSC.2005.1520156. (Year: 2005).*

*Primary Examiner* — Jeff Zimmerman
*Assistant Examiner* — Wayne S. Murray
(74) *Attorney, Agent, or Firm* — Browdy and Neimark, P.L.L.C.

(57) ABSTRACT

The invention provides a system and method for executing payment of a fare for fare collection and validation for a journey on a vehicle in a transportation network. For each journey taken by an individual on the transportation system, a central server receives from a mobile device of the individual an identifier of the mobile device together with data indicative of a station of embarkation of the journey. The mobile device identifier and the station of embarkation are transmitted to the central server over one or more wireless networks. The central server comprises a processor configured to determine a fare for the journey based on the station of embarkation.

14 Claims, 6 Drawing Sheets

(51) Int. Cl.
*G06Q 10/02* (2012.01)
*G06Q 20/32* (2012.01)

(56) References Cited

U.S. PATENT DOCUMENTS

| | | | |
|---|---|---|---|
| 2011/0166914 A1* | 7/2011 | Dixon | G06Q 20/354 |
| | | | 705/13 |
| 2012/0024951 A1 | 2/2012 | Graeber | |
| 2012/0101942 A1* | 4/2012 | Park | G06Q 20/0457 |
| | | | 705/40 |
| 2012/0254040 A1 | 10/2012 | Dixon et al. | |
| 2013/0268304 A1 | 10/2013 | Doshi | |
| 2014/0278616 A1* | 9/2014 | Stone | G06Q 10/025 |
| | | | 705/6 |
| 2014/0379391 A1* | 12/2014 | Lulic | G06Q 20/40 |
| | | | 705/5 |

* cited by examiner

METHOD AND SYSTEM FOR FARE COLLECTION AND VALIDATION ON A TRANSPORTATION NETWORK

PRIORITY INFORMATION

The present application claims priority as a national stage entry of International Application No: PCT/IL2014/051074, filed on Dec. 9, 2014, which claims priority from International Application No: PCT/IL2014/050671, filed on Jul. 23, 2014.

FIELD OF THE INVENTION

The present invention relates to systems for fare collection and validation on a transportation network.

BACKGROUND OF THE INVENTION

Use of mobile communication devices to execute a payment for goods or services is well known today. In one particular application, mobile devices are used to execute payment of fare for a journey on public transportation. Typically, a passenger uses a mobile communication device, such as a mobile telephone to transmit to the transportation provider an identification of a station where the passenger is to board a public transportation vehicle and subsequently transmits to the service provider an identification of the station where the passenger disembarks. This information is used by the service provider to determine the fare for the passenger's journey, and to debit the passenger, for example, via the passenger's mobile phone or credit card account. The service provider may also transmit to the passenger's mobile device an "electronic ticket' which can be displayed on a screen of the mobile device, which may be shown to an inspector that the fare has been paid. This type of payment system, however, can only be used in transportation systems where only one service provider provides transportation between the passengers boarding and disembarkation stations.

US Patent Publication No. 1 20120290201, for example, discloses a system for generating passenger bookings along transportation routes. A request is generated at a mobile computing device including route data that is transmitted to a server system. The route data and fare data from the server system are received at the mobile computing device and displaying on the mobile computing device. A user input at the mobile computing device, in response to receiving the single user input, generates booking data that are transmitted to the server system. Confirmation data from the server system is sent to the mobile computing device, and displayed on the display of the mobile computing device.

US Patent Publication No. 20120254040 discloses a system for enabling wireless mobile devices to be automatically detected and used as fare media on vehicles in a transportation system. A wireless mobile device is detected and utilizing a unique identifier of the wireless mobile device, a transit user's entry to and exit from a transit vehicle is tracked. The wireless mobile device displays a fare payment indicator, allowing the transit user to use the wireless mobile device to show proof of payment if solicited by a fare inspector. A corresponding fare can be calculated and paid for in a variety of ways.

SUMMARY OF THE INVENTION

The present invention provides a system and method for fare collection and validation in a transportation system in which one or more service providers provide transportation services.

In one embodiment of the invention, an individual who has boarded a vehicle of one of the service provider's in the transportation system inputs an identifier of the vehicle using a mobile device. The identifier of the vehicle, together with an identifier of the mobile device is communicated from the mobile device to a central server. Receipt of these data at the central server creates a file for the journey in a memory of the central server. Once the journey file has been created in the central server, the central server queries a global positioning system (GPS) positioned on the vehicle for the current location of the vehicle. The current location of the vehicle is transmitted to the central processor over the communication network and is added to the journey file in the central server.

The central server transmits to the mobile device confirmation that the onset of the journey has been recorded in the central server and queries the individual for the name of the station at which the individual intends to disembark from the vehicle. The station of disembarkation is transmitted to the central server, and this information is recorded in the journey file. The central server then transmits to the mobile device an electronic ticket that can be displayed on the mobile device screen, and shown to an inspector as proof that a ticket for the journey has been obtained.

The central sever determines a fare for the individual's journey, and records the journey details and the determined fare in a log of the individual's journeys in the transportation system. If the individual has a limited prepaid ticket that is valid for the journey, the journey is deducted from the prepaid ticket, and the deduction is recorded in the individual's journey log. If the individual does not have a prepaid ticket, or has a prepaid ticket that is not valid for the present journey, the individual's financial instrument is debited for the journey fare.

In another embodiment of the invention, one or more receivers are located at one or more stations that are configured to receive signals generated by passengers at the station. The receivers may be positioned in the station adjacent to, or inside, an entrance or exit barrier of the station. Each receiver communicates with a processor, which may be located in the station, possibly inside a barrier of the station. Each processor is configured to communicate with a central server over the communication network. An individual upon entering a station of embarkation generates a first unique identification signal using a mobile device that is transmitted from the mobile device to the receiver located at the station of embarkation. Upon recipe of the individual's first unique identification signal, an entrance barrier may be opened to admit the individual to the station of embarkation. An identifier of the embarkation station, together with an identifier of the individual's mobile device, is communicated to the central processor where a file for the journey is created in a memory of the central server, and an appropriate electronic ticket is generated for the journey that is transmitted to the individual's mobile device When the individual arrives at the station of disembarkation, the individual generates a second unique identification signal using the individual's mobile device that is transmitted from the mobile device to the receiver located at the station of embarkation. Upon recipe of the second unique identification signal, an exit barrier may be opened to allow the individual to exit the station of disembarkation. The station of disembarkation is transmitted to the central server together with an identification of the individual, and an appropriate electronic ticket is generated for the journey that is transmitted to the individual's mobile device Thus, in one of its aspects, the present invention provides a system for executing payment of a fare for fare collection and validation for a journey on a vehicle in a transportation network comprising one or more service providers, each service provider operating one or more transportation vehicles, the system comprising:

a central server comprising a processor, the processor configured to, for each journey taken by an individual on the transportation system:

receive from a mobile device of the individual an identifier of the mobile device of the individual, the identifier of the mobile device of the individual being transmitted to the central server over one or more wireless communication networks;

receive data indicative of a station of embarkation of the journey, the data indicative of a station of embarkation of the journey being transmitted to the central server over one or more wireless communication networks; and     determine a fare for the journey based on the station of embarkation.

In the system of the invention, one or more vehicles in the transportation system may be provided with a unique identifier of the vehicle, and in this case, the processor may be further configured to receive the data indicative of the identifier of a vehicle in the transportation system on which the journey occurs, where the data indicative of the identifier of a vehicle in the transportation system on which the journey occurs is transmitted to the central server over one or more wireless communication networks.

One or more of the vehicles in the transportation system may be provided with a device configured to determine a current location of the vehicle. In this case, data indicative of a station of embarkation of the journey may comprise the unique identifier of the vehicle and a first current location of the vehicle. The device configured to determine a current location of the vehicle may be, for example, a GPS antenna.

Each of one or more stations in the transportation system may be provided with a unique identifier of the station. In this case, the processor may be further configured to receive the identifier of a station in the transportation system on which the journey occurs, where the identifier of a station in the transportation system on which the journey occurs is transmitted to the central server over one or more wireless communication networks.

The processor may be further configured to determine whether the fare for the journey has been prepaid, and if the fare has not been prepaid for the journey, to debit a predetermined financial instrument for the journey fare.

The processor may be further configured to receive data indicative of a station of disembarkation, where the data indicative of a station of embarkation of the journey is transmitted to the central server over one or more wireless communication networks, and the determining a fare for the journey is further based on the station of disembarkation. The data indicative of a station of disembarkation of the journey may comprise, for example, a unique identifier of a vehicle and a second current location of the vehicle. The data indicative of a station of disembarkation of the journey may comprise, for example, a unique identifier of a station and a second current location of the vehicle.

The processor may be further configured to determine an identifier of a route being executed by the transportation vehicle, in which case, determining a fare for the journey may be further based on the route being executed by the vehicle.

The identifier of a vehicle may be, for example, a barcode, a QR code, an electromagnetic signal in a predetermined frequency range, or an acoustical signal in a predetermined frequency range. The mobile device may be, for example, a smart phone, a mobile phone, a near-field-communication enabled mobile phone, a tablet, personal computer, a personal digital assistant, or an e-book reader.

The system may comprise two or more service providers.

The processor may be further configured to transmit to the mobile device over one or more wireless communication systems confirmation that the onset of the journey has been recorded in the central server. The processor may further configured to transmit to the mobile device over one or more wireless communication systems an electronic ticket for the journey.

The processor may be further configured to maintain a log of journeys taken on the transportation system by one or more individuals. The log of journeys may include, for example, includes, for one or more journeys taken on the transportation system any one or more of the following:

whether a fare for the journey has been prepaid;
    a station of boarding;
    a station of disembarkation;
    the fare determined for the journey;
    an identity of the individual taking the journey; and
    a financial instrument for debiting the fare of the journey;

The processor may be further configured to perform any one or more of the following:

determine whether the individual has a prepaid ticket;
    if the individual has a prepaid ticket, to determine whether the prepaid ticket is valid for a journey taken by the individual on the transportation system;
    if the individual has a prepaid ticket that is not valid for the journey taken by the individual debiting the individual's financial instrument for the journey fare;
    if the individual has a prepaid ticket that is valid for the journey, to determine whether the valid prepaid ticket is a limited prepaid ticket or an unlimited prepaid ticket; and
    if the individual has a limited prepaid ticket deducting the journey from the limited prepaid ticket.

In another of its aspects, the invention provides a method for executing payment of a fare for fare collection and validation for a journey on a vehicle in a transportation network comprising one or more service providers, each service provider operating one or more transportation vehicles, the method comprising:

receiving from a mobile device of the individual an identifier of the mobile device of the individual, the identifier of the mobile device of the individual being transmitted to a central server over one or more wireless communication networks;
    receiving data indicative of a station of embarkation of the journey, the data indicative of a station of embarkation of the journey being transmitted to the central server over one or more wireless communication networks; and
    determining a fare for the journey based on the station of embarkation.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DESCRIPTION OF THE INVENTION

Figure 1:
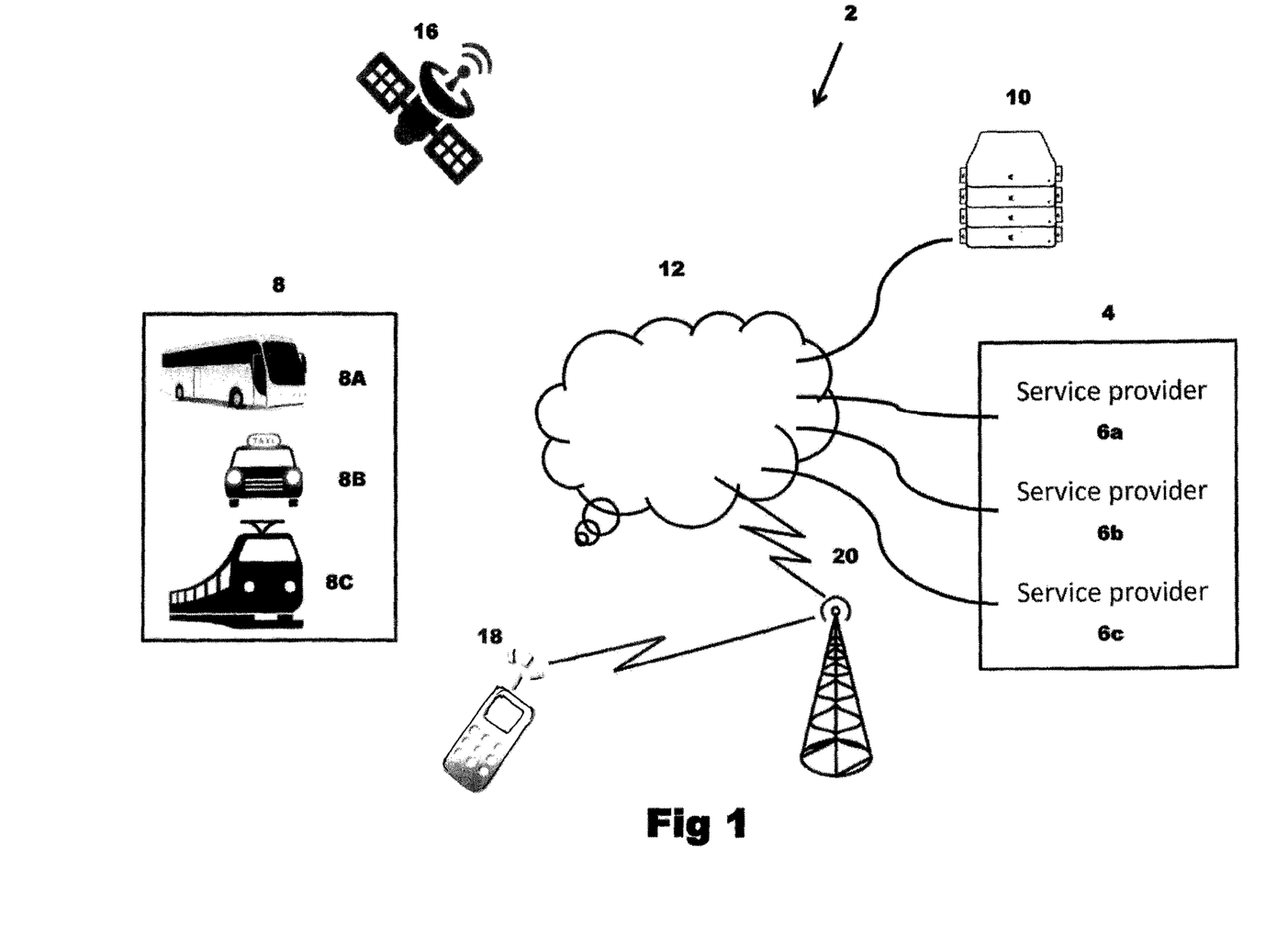
FIG. 1 shows a system for fare collection and validation in a transport system in accordance with one embodiment of the invention.

FIG. 1 shows schematically a diagram of a system 2 for fare collection and validation in a transportation system 4 in which one or more service providers 6 provide transportation services, in accordance with one embodiment of the invention. Three service providers, 6a, 6b, and 6c are shown in FIG. 1. This is by way of example only, and the transportation system may comprise any number of transportation providers. Each transportation provider operates a fleet of vehicles, such as the fleet 8. The fleet 8, may consist of a plurality of identical vehicles, or, as shown in FIG. 1, may comprises different type of vehicles, such as buses 8a, taxis 8b or trains 8c. Each service provider 6 communicates with a central server 10 over a communication network indicated by the cloud 12. The communication network may be for example, the Internet, a local area network, a wide area network, or a wireless or wired telephone network.

Figure 2:
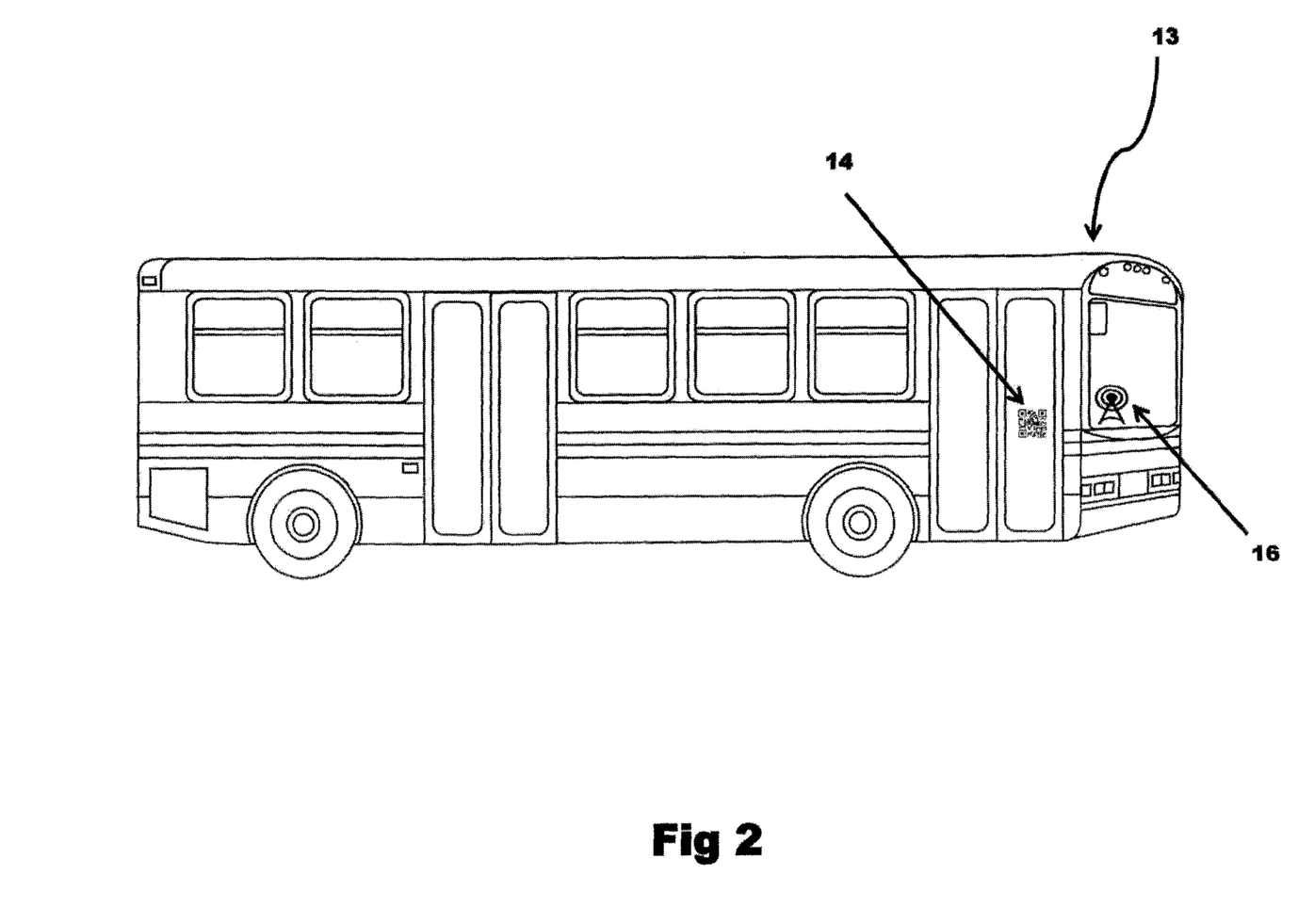
FIG. 2 shows a vehicle in the transport system of FIG. 1.

FIG. 2 shows a vehicle 13 that may be part of a fleet of vehicles of one of the service providers 6. Each vehicle in the transportation system 4 is provided with an identifier 14 of the vehicle. The identifier 14 of each vehicle in the transportation system 4 is unique, and thus unequivocally identifies the vehicle. The identifier 14 may be in the form of a barcode or a QR code. Alternatively, the identifier may be a unique acoustical signal or electromagnetic signal in a predetermined frequency range. In addition, the vehicle 14 is provided with a device 15 for determining the current location of the vehicle. The device 15 may be, for example, a global positioning system (GPS) antenna 15 that receives signals from one or more satellites 16 (FIG. 1) and determines from the received signals the current location of the vehicle. As explained below, the current location of the vehicle is periodically transmitted to the central processor over the communication system 12.

Referring again to FIG. 1, the system 2 allows individuals to use a personal mobile communication device 18 to inform the transportation system 4 that the individual is taking a journey on a vehicle of the transportation system 4. The mobile device 18 may be, for example, a smart phone or other mobile phone (including a near-field-communication (NFC)-enabled mobile phone, a tablet personal computer (PC), a personal digital assistant (PDA), an e-book reader, or other device. The mobile device 18 communicates over a wireless telephone system 20 that communicates with the central server 10 over the communication system 12.

An individual wishing to pay fares using the passenger's mobile device or to purchase prepaid tickets for future journeys on the transpiration system, may be required to download onto the mobile device an application from the central server 10. The individual may be required to register in advance and to provide personal data (name, address, mobile phone number etc.) as well as a financial instrument for executing payment of fares, such as the individual's mobile phone account, or credit card number. This data is stored in the user's file in a memory of the central server 10.

Figure 3:
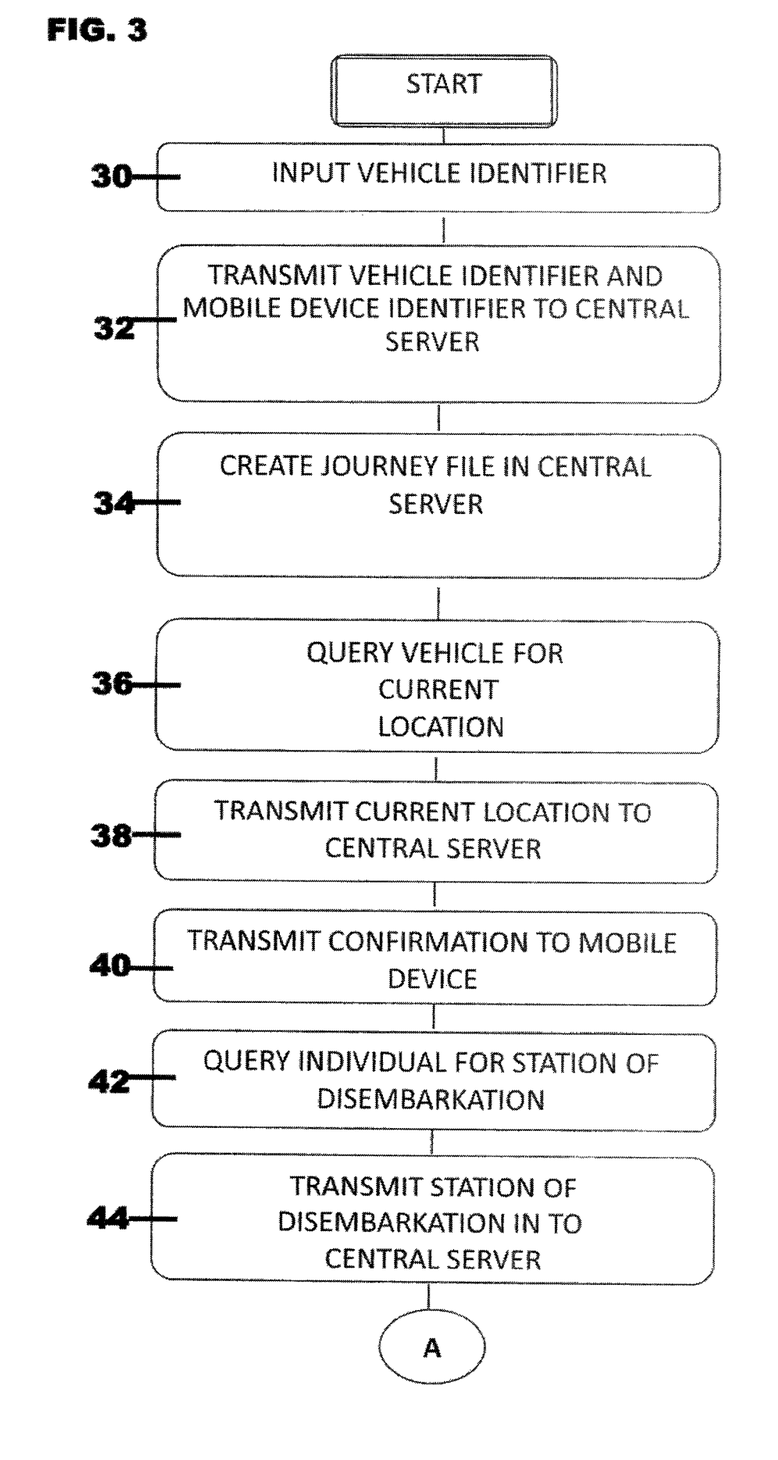
FIG. 3 shows a method for fare collection and validation in a transport system in accordance with one embodiment of the invention.

FIG. 3 shows a flow chart for a method of executing payment of fares in a transportation system, such as the transportation system 4. In step 30, an individual who has boarded a vehicle of one of the service provider's 6, inputs the identifier 14 of the vehicle using a mobile device, such as the mobile device 18. If for example, the identifier 14 is a barcode or a QR code, the individual may photograph the barcode or QR code with a camera associated with the mobile device. If the identifier 14 is an acoustical signal, the individual may record the acoustical signal using a microphone associated with the mobile device that is sensitive to acoustic waves in the frequency range of the signal. Then, in step 32, the identifier of the vehicle, together with an identifier of the mobile device 18, is communicated from the mobile device 18 over the wireless communication system 20 and then onto the central server 10 over the communication system 12. Receipt of these data at the central server 10 creates a file for the journey in a memory of the central server (step 34). Once the journey file has been created in the central server 10, the central server queries the GPS 15 of the vehicle for the current location of the vehicle (step 36). The central server 10 may search in a memory an identifier of the service provider whose vehicle has been identified, and may also search in a memory an identifier of the route in which the identified vehicle is currently traveling in. In the case that the system 2 comprises two or more service providers 6, the central server 10 may search in a memory an identifier of the service provider whose vehicle has been identified. Then, in step 38, the current location of the vehicle is transmitted to the central processor 10 over the communication network 12, and is added to the journey file in the central server 10.

The central server, in step 40, then transmits to the mobile device confirmation that the onset of the journey has been recorded in the central server and in step 42 queries the individual for the name of the station at which the individual intends to disembark from the vehicle. This may be done, for example, by displaying on a screen of the mobile device a list of stations and requesting the individual to indicate from the list the station at which the individual intends to disembark from the vehicle. The station of disembarkation is transmitted to the central server (step 44), and this information is recorded in the journey file (step 46). In step 50, the central sever determines a fare for the individual's journey, and in step 52 records the journey details and the determined fare in a log of the individual's journeys in the transportation system.

In step 54, it is determined whether the individual has a prepaid ticket. This is performed by searching in a memory of the central server 10. If the individual has a prepaid ticket, then in step 56, it is determined whether the prepaid ticket is valid for the present journey. If the prepaid ticket is valid, then in step 58, it is determined whether the prepaid ticket is an unlimited ticket. If yes, the process proceeds to step 68 with the transmission to the mobile device 18 an electronic ticket that can be displayed on the mobile device screen, and shown to an inspector as proof that a ticket for the journey has been obtained. The process then terminates. If in step 58 it is determined that the prepaid ticket is not an unlimited ticket, the process continues to step 60 with the journey being deducted from the prepaid ticket. The deduction is then recorded in the individual's journey log (step 62). The process then proceeds to step 68 with the transmission to the mobile device 18 an electronic ticket that can be displayed on the mobile device screen, and shown to an inspector as proof that a ticket for the journey has been obtained, and the process terminates.

If in step 54, it is determined that the individual does not have a prepaid ticket, or in step 56 the individual has a prepaid ticket that is not valid for the present journey, the process continues to step 64 with the individual's financial instrument being debited for the journey fare. The process then continues to step 66 where the debit for the journey is recorded in the individual's journey log. The process then proceeds to step 68 with the transmission to the mobile device 18 an electronic ticket that can be displayed on the mobile device screen, and shown to an inspector as proof that a ticket for the journey has been obtained, and the process terminates.

Figure 4:
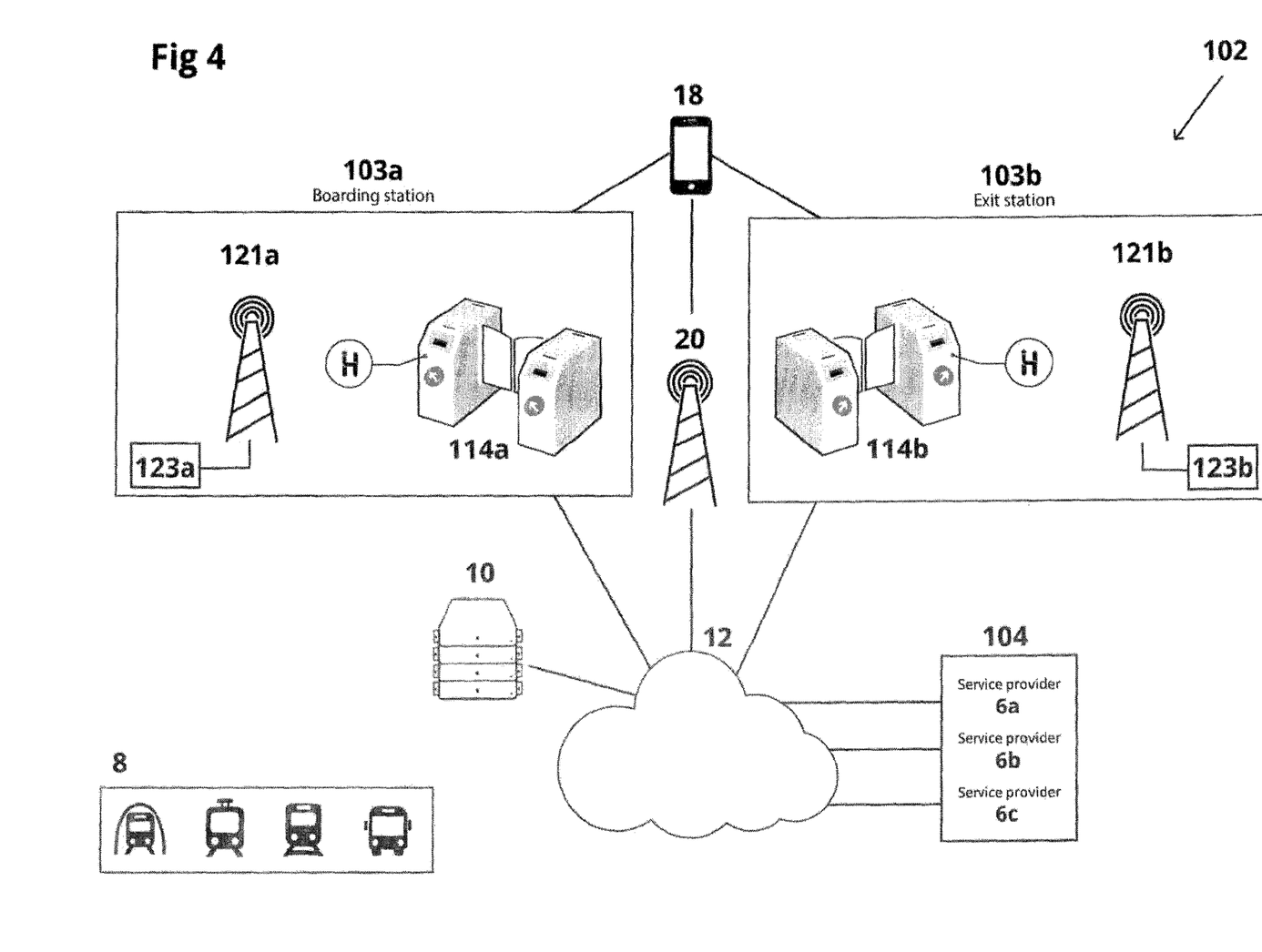
FIG. 4 shows a system for fare collection and validation in a transport system in accordance with another embodiment of the invention.

FIG. 4 shows schematically a diagram of a system 102 for fare collection and validation in a transportation system 104 in accordance with another embodiment of the invention. The system 102 has several components in common with the system 2 of FIG. 1, and similar components are indicated by the same reference numeral in FIGS. 1 and 4 without further comment. In the system 102, one or more service providers 6 provide transportation services. Three service providers, 6a, 6b, and 6c are shown in FIG. 1. This is by way of example only, and the transportation system may comprise any number of transportation providers. Each transportation provider operates a fleet of vehicles, such as the fleet 108, which in the example shown in FIG. 4, is a fleet of trains, busses and street cars. Each service provider 6 communicates with a central server 10 over a communication network indicated by the cloud 12. The communication network may be for example, the Internet, a local area network, a wide area network, or a wireless or wired telephone network.

FIG. 4 also shows two stations 103a and 103b of the transportation system 104. Each station 103 includes one or more barriers 114. Also located at each station, are one or more receivers 121 that are configured to receive signals generated by passengers at the station, as explained below. The receivers 121 may be positioned in the station adjacent to, or inside, an entrance or exit barrier of the station. Each receiver 121 communicates with a processor 123, which may be located in the station, possibly inside a barrier of the station. Each processor 123 is configured to communicate with the central server 10 over the communication network 12, as explained below.

The system 102 allows individuals to use a personal mobile communication device 18 to inform the transportation system 104 that the individual is taking a journey on a vehicle of the transportation system 104. The mobile device 18 may be, for example, a smart phone or other mobile phone (including a near-field-communication (NFC)-enabled mobile phone, a tablet personal computer (PC), a personal digital assistant (PDA), an e-book reader, or other device. The mobile device 18 communicates over a wireless telephone system 20 that communicates with the central server 10 over the communication system 12.

An individual wishing to pay fares using the passenger's mobile device or to purchase prepaid tickets for future journeys on the transpiration system 104, may be required to download onto the mobile device an application from the central server 10. The individual may be required to register in advance and to provide personal data (name, address, mobile phone number etc.) as well as a financial instrument for executing payment of fares, such as the individual's mobile phone account, or credit card number. This data is stored in the user's file in a memory of the central server 10.

Figure 5:
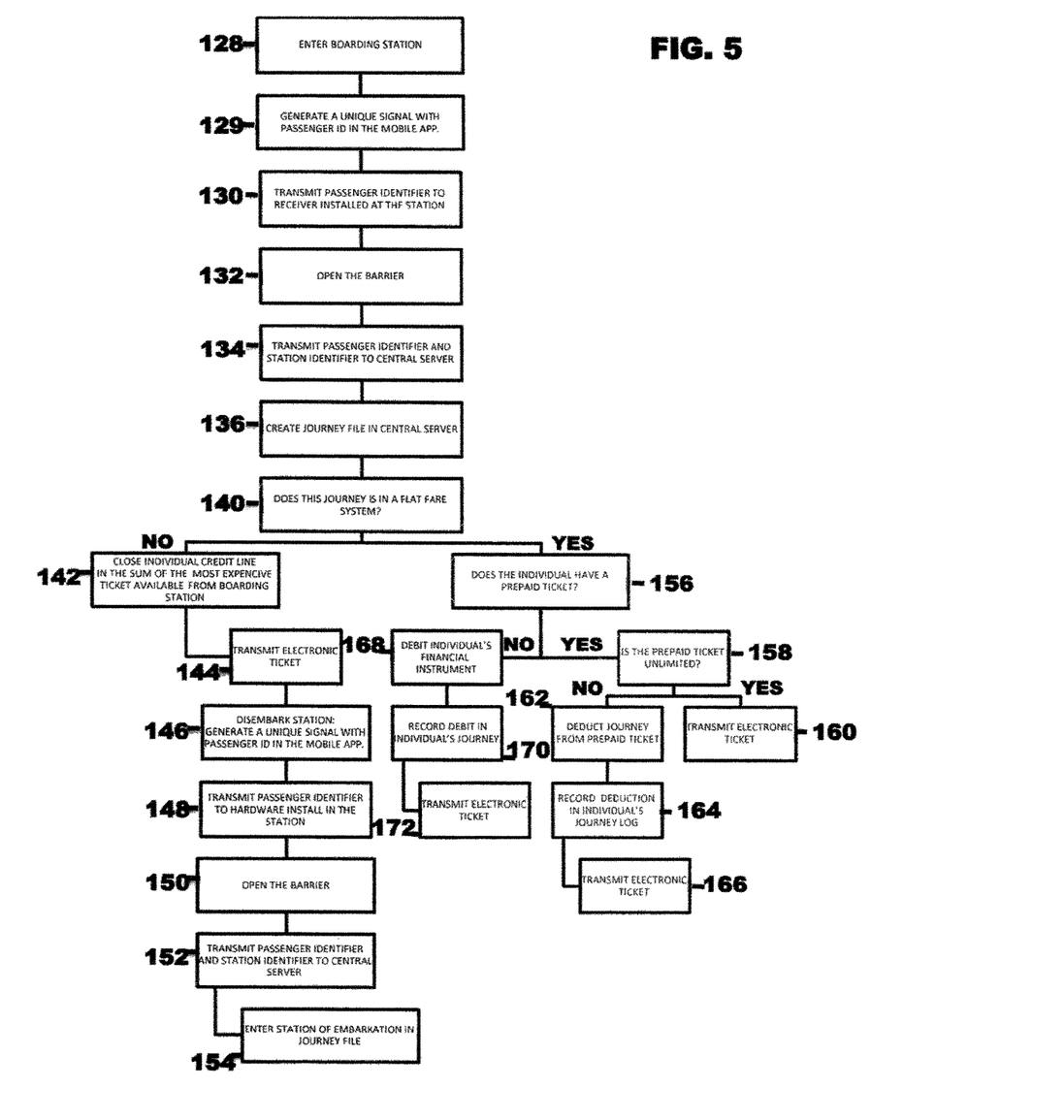
FIG. 5 shows a method for fare collection and validation in a transport system in accordance with another embodiment of the invention

FIG. 5 shows a flow chart for a method of executing payment of fares in a transportation system in such as the transportation system 104, in accordance with another embodiment of the invention. In step 128, an individual enters a station of embarkation of the transportation system, such as the station 103a, and then, in step 129 generates a first unique identification signal using a mobile device, such as the mobile device 18. The first unique identification signal may be, for example, a barcode or a QR code, in which case, the receiver 121a may be a camera or barcode reader. If the first unique identification signal is an acoustical signal, the receiver 121 may be a microphone that is sensitive to acoustic waves in the frequency range of the signal. The first unique identification signal may also be a Bluetooth signal. The first unique identification signal, in step 130, is transmitted from the mobile device to the receiver 121a located at the station of embarkation. The first unique identification signal may be stored in a memory of the processor 123a. Upon recipe of the individual's first unique identification signal, the entrance barrier 114a is opened (step 132), and the individual passes through the barrier.

Next, in step 134, an identifier of the embarkation station, together with an identifier of the mobile device 18, is communicated from the processor 123a over the communication system 12 to the central processor. Receipt of these data at the central server 10 creates a file for the journey in a memory of the central server (step 136). Once the journey file has been created in the central server 10, the central server, in step 140, determines whether the journey is to take place in a so-called "flat fare system", in which all journeys cost the same. If no, then in step 142, the individual's credit line is closed in the amount of the maximal price of a journey from the station of embarkation, and the central server 10, in step 144, issues an electronic ticket for the journey that is transmitted to the individual's mobile device 18 over the communication network 12 and then over the communication network 20.

When the individual arrives at the station of disembarkation, such as the station 103b, and wishes to pass through an exit barrier, such as the barrier 114b, the individual, in step 146, generates a second unique identification signal using the mobile device 18. The second unique identification signal may be the same as the first unique signal that the individual generated at the station of embarkation, or may be different from the first unique identification signal. The second unique identification signal, in step 148, is transmitted from the mobile device to the receiver 121b located at the station of embarkation. The second unique identification signal may be stored in a memory of the processor 123b. Upon recipe of the second unique identification signal, the exit barrier 114b is opened (step 150), and the individual exits the station of disembarkation. The station of disembarkation is transmitted to the central server (step 152) together with an identification of the individual, and this information is recorded in the journey file (step 154).

From step 154, or from step 140 in the case that the journey is in a flat fare system, the process continues with step 156, where it is determined whether the individual has a prepaid ticket. If the individual has a prepaid ticket, then in step 158, it is determined whether the prepaid ticket is an unlimited prepaid ticket. If the prepaid ticket is an unlimited prepaid ticket, then in step 160, an electronic ticket is generated and transmitted to the mobile device 18, and the process terminates. If the prepaid ticket is not an unlimited prepaid ticket, then in step 162, the cost of the journey is deducted from the prepaid ticket, and the individual's balance is recorded in the individual's journey log (step 164).

An electronic ticket is then generated and transmitted to the mobile device 18 (step 166), and the process terminates.

If, at step 156, it is determined that the individual does not have a prepaid ticket, then in step 168, the individual's financial instrument is debited. The debit is recorded in the individual's journey log (step 170). An electronic ticket is then generated and transmitted to the mobile device 18 (step 172), and the process terminates.

The invention claimed is:

1. A data routing and security system configured to protect transactions between individual customers having mobile communication devices and a multi-vehicle transit system where each vehicle has a communication device, said distributed routing and security system comprising:
   a) a first communication channel configured to receive communication from at least one individual customer communication device upon embarkation of a selected vehicle;
   b) a second communication channel separate from said first communication channel configured to receive communications from at least one transit vehicle;
   c) a central processor configured to receive vehicle location at selected times, to combine individual customer data received via said first communication channel with selected vehicle data received via said second communication channel, to create discrete private journey files for each journey for each individual customer entering the transit system, and to calculate individual customer fares based upon the combining of journey data received via said second communication channel and individual customer data received via said first communication channel in said central processor;
   said central processor being configured to operate to keep individual customer information separate from information accessed by said vehicles in accordance with the following steps:
   i) receiving from a selected individual customer mobile device an identifier of said selected individual customer mobile device via said first communication channel;
   ii) receiving from said selected individual customer mobile device via said first communication channel an identifier for a selected vehicle in said transit system;
   iii) receiving via said second communication channel from said selected vehicle both a vehicle identification and first journey data indicative of a first location of the vehicle;
   iv) determining a station of embarkation of said individual customer;
   v) creating a first journey file for said selected individual customer, said first journey file including: said mobile device identifier as received via said first communication channel; and journey data as received via said second communication channel; and
   vi) determining a first journey fare for said selected individual customer based upon at least data received via said first communication channel and said second communication channel;
   wherein said first communication channel does not transmit location data and said second communication channel does not transmit an identifier of said selected individual customer mobile device.

2. The system according to claim 1 wherein each of one or more stations in the transportation system are provided with a unique identifier indicative of the station, and the central processor is further configured to receive the unique identifier of a station in the transportation system from which said first journey occurs, the unique identifier of said first station of embarkation being transmitted to the central processor via said second channel.

3. The system according to claim 2 wherein said central processor is further configured to determine whether said first journey fare for the journey has been prepaid, and to debit a predetermined financial instrument for said first journey fare, if not prepaid.

4. The system according to claim 2 wherein said central processor is further configured to receive a unique identifier indicative of a selected station of disembarkation, the data indicative of said selected station of embarkation of said first journey being transmitted to the central processor over one or more wireless communication networks, and step (vi) of determining said first journey fare for the journey is further based on said selected station of disembarkation.

5. The system according to claim 4 wherein the data indicative of said selected station of disembarkation of said first journey comprises the unique identifier of said selected vehicle and a second current location of said selected vehicle of the journey.

6. The system according to claim 5 wherein the data indicative of said selected station of disembarkation of said first journey comprises the unique identifier of said selected station of disembarkation and the second current location of said selected vehicle.

7. The system according to claim 6 wherein said central processor is further configured to determine an identifier of a selected route being traveled by said selected vehicle and step (vi) of determining said first journey fare is further based on said selected route being traveled by said selected vehicle.

8. The system according to claim 1 wherein said identifier of said selected vehicle comprises a barcode, a QR code, an electromagnetic signal in a predetermined frequency range, or an acoustical signal in a predetermined frequency range.

9. The system according to claim 1 wherein the mobile device comprises a smart phone, a mobile phone, a near-field-communication enabled mobile phone, a tablet, personal computer, a personal digital assistant, or an e-book reader.

10. The system according to claim 1, wherein said transit system comprises at least two service providers.

11. The system according to claim 1 wherein said central processor receives the vehicle location from a GPS antenna.

12. The system according to claim 1 wherein said central processor is further configured to transmit to said selected mobile device over one or more wireless communication systems confirmation that the onset of said first journey has been recorded in the central processor.

13. The system according to claim 12 wherein said central processor is further configured to transmit to said selected customer mobile device over one or more wireless communication systems an electronic ticket for said first journey.

14. The system according to claim 13 wherein said discrete private journey files comprise at least one of:
   a) status of a prepayment for a selected journey;
   b) a station of boarding;
   c) a station of disembarkation;
   d) the fare determined for a selected journey;
   e) an identity of a selected individual taking the journey;
   f) a financial instrument for debiting the fare of the journey; and
   g) authorization for a prepaid ticket to pay for a particular journey.

* * * * *